United States Patent
Paul

(10) Patent No.: US 7,426,832 B2
(45) Date of Patent: Sep. 23, 2008

(54) UNIVERSAL THERMODYNAMIC GAS TURBINE IN A CLOSED CARNOT CYCLE

(76) Inventor: Marius A. Paul, 1120 E. Elm Ave., Fullerton, CA (US) 92831

(*) Notice: Subject to any disclaimer, the term of this patent is extended or adjusted under 35 U.S.C. 154(b) by 551 days.

(21) Appl. No.: 11/212,815

(22) Filed: Aug. 25, 2005

(65) Prior Publication Data
US 2006/0272329 A1 Dec. 7, 2006

Related U.S. Application Data

(60) Provisional application No. 60/604,732, filed on Aug. 25, 2004.

(51) Int. Cl.
*F01K 7/34* (2006.01)
(52) U.S. Cl. .................. 60/653; 60/677; 60/682; 60/684
(58) Field of Classification Search .............. 60/653, 60/677, 682–684
See application file for complete search history.

(56) References Cited

U.S. PATENT DOCUMENTS

| | | | | |
|---|---|---|---|---|
| 3,503,204 A * | 3/1970 | Suter | ............... | 376/211 |
| 4,858,428 A * | 8/1989 | Paul | ............... | 60/39.17 |
| 5,056,314 A * | 10/1991 | Paul et al. | ............... | 60/609 |
| 6,282,897 B1 * | 9/2001 | Paul | ............... | 60/598 |
| 6,418,707 B1 * | 7/2002 | Paul | ............... | 60/784 |
| 6,725,643 B1 * | 4/2004 | Paul | ............... | 60/39.162 |
| 6,751,940 B1 * | 6/2004 | Paul | ............... | 60/39.162 |

* cited by examiner

*Primary Examiner*—Hoang M Nguyen
(74) *Attorney, Agent, or Firm*—Richard Esty Peterson, Esq.

(57) ABSTRACT

A closed-cycle gas turbine power generator system with a combined cycle system with a neutral gaseous primary motive medium and a secondary phase change medium with a lower pressure sub-system having a counter-rotating compressor module in combination with a counter-rotating gas turbine module, and with a higher pressure sub-system having a counter-rotating compressor module and a counter-rotating gas turbine module wherein the phase change medium in liquid form is injected into the compressor modules during compression of the primary motive medium with the phase change medium changing to a gas to form a compressed gaseous mixture that is heated by the heat source and supplied to the gas turbine module of the higher pressure sub-system for partial expansion and combining with a heated portion of the compressed gaseous mixture from the compressor module for final expansion in the lower pressure gas turbine modules.

6 Claims, 2 Drawing Sheets

UNIVERSAL THERMODYNAMIC GAS TURBINE IN A CLOSED CARNOT CYCLE

RELATED APPLICATION

This application claims the benefit of provisional application Ser. No. 60/604,732, filed on Aug. 25, 2004.

BACKGROUND OF THE INVENTION

This invention relates to efficient closed-cycle, gas turbine power generators. In particular, this invention utilizes combined thermal and cooling cycles to enable power generation with reduced heat dissipation that may result in an unwanted thermal signal.

This invention applies a maximization of the energetic capacity of the Brayton cycle to the highest elevated thermal efficiency of the Carnot cycle in a closed thermal cycle.

The invention utilizes the modular and structural components described in my prior patents: U.S. Pat. No. 6,282,897, entitled, "Advanced Thermo-Electric System for Hybrid Electric Vehicle;" U.S. Pat. No. 6,418,707 for "General Advanced Power System;" and U.S. Pat. No. 6,725,643 for "High Efficiency Gas Turbine Power Generation Systems." The modular and structural components are reconfigured and arranged in a novel closed thermal cycle system that achieves the high efficiencies of a Carnot cycle.

In certain environments, a closed thermal cycle with reduced heat dissipation is advantageous. This can be achieved by incorporating a phase-change medium into the closed circuit of the primary working medium. In the preferred embodiments described, the working medium is an inert gas such as Helium, Argon or Xenon and the phase-change medium is Freon. It is understood that other fluid combinations can be utilized.

SUMMARY OF THE INVENTION

The closed-cycle gas turbine power generation system of this invention utilizes a combined cycle of a primary neutral gas working medium and a secondary phase change medium. The use of a phase change medium, such as Freon, in the combined cycle, enables energy generation in a closed cycle with reduced external heat dissipation. This feature may be advantageous where it is desirable that the energy generation system leave a low thermal signal that avoids providing an unwanted target. Also, in some circumstances, the closed combined cycle system of this invention may be advantageous when using nuclear fuels and the entire system is desired to be self-contained.

In the combined cycle system, a lower pressure sub-system is combined with a higher pressure sub-system. In each sub-system, a counter-rotating compressor module operates in conjunction with a counter rotating turbine module. The term counter-rotating is used to define a two-stage radial rotor unit with rotors that rotate in opposite directions to maximize the resultant effect of compression or expansion. In the combined cycle system, the phase change medium is strategically injected as liquid into the compressor modules to cool the compressed primary motive medium and mix as an added motive gas with the primary motive gas. This enables a substantial part of the compression cycle to remain isothermal to maximize the density of the gas mixture when introduced to the heat source. In addition to improving efficiencies, the maximum temperature for expansion in the high pressure turbine module can be controlled to the peak temperature allowable for the particular materials utilized in the high pressure turbine. For added optimization of the system, partially expanded and cooled gases from the high pressure turbine module can be re-invigorated by mixing with a portion of the gases from the low pressure compressor module that are heated by a thermal source before expansion in a low pressure turbine module.

Final expansion and cooling in the low pressure turbine module permits the cooled gas mixture to cycle to a condenser where the phase change medium is separated as a liquid from the primary neutral motive gas. The compressor stages are preferably driven by electric motors and the turbine stages preferably drive electric generators with the net electrical power output being available for storage or use.

These and other features of the invention are described in greater detail in the detailed description of the preferred embodiment that follows.

DETAILED DESCRIPTION OF THE PREFERRED EMBODIMENTS

Figure 1:
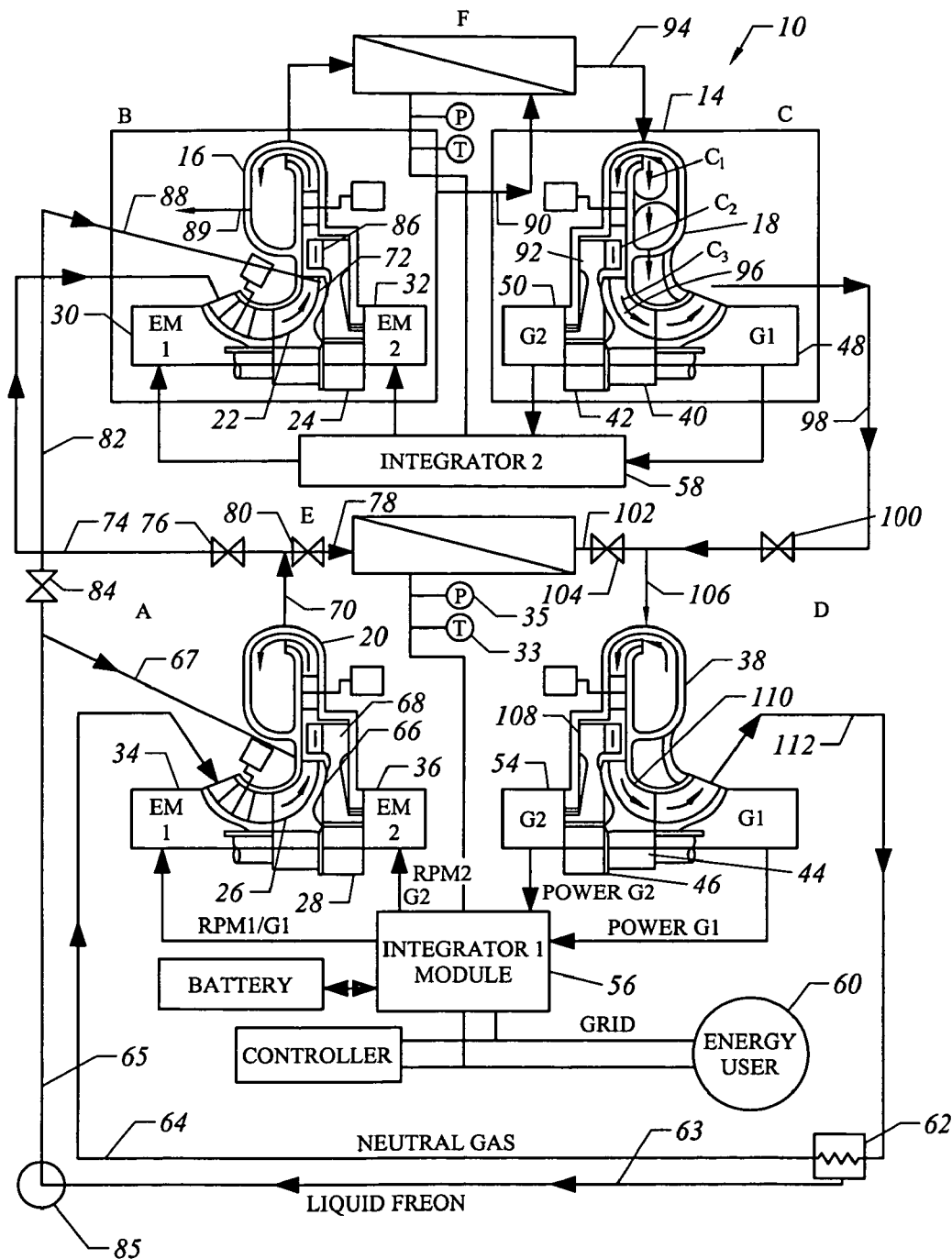
FIG. 1 is a schematic illustration of the arrangement of components in the closed cycle system of this invention.

Referring to FIG. 1, the modular compressors and modular gas turbines are grouped in a high pressure and low pressure system similar to the configuration of the system disclosed in my U.S. Pat. No. 6,282,897, which is incorporated herein by reference.

In FIG. 1, the lower pressure sub-system, depicted as FIG. 1.*a*, is coupled to the higher pressure sub-system depicted as FIG. 1.*b*. In the combined system, two counter-rotating compressor modules, A and B, form two primary stages of compression with 20-25 pressure ratios. Similarly, two counter rotating gas turbine modules, C and D, form two primary stages of expansion. The heat sources E and F may comprise a nuclear reactor, thermal combustor, external combustion chamber, geothermal heat sink or other thermal source or combination of sources. The heat sources raise the temperature of the compressed gases and provide a gas turbine cycle with peak pressures of 200-300 atm for very high pressure ratios in the staged gas turbine modules, C and D.

In the system shown, designated generally by the reference numeral 10, the high pressure compressor module B and the high pressure turbine module C are enclosed in individual pressurized chambers 12, 14, wherein internal pressures in the compressor 16 and gas turbine 18 are equalized with the chamber pressures to eliminate mechanical stresses associated with high pressures.

In the compressor modules A and B, the compressors 16, 20 have counter rotating rotors 22, 24 and 26, 28 with each rotor driven by a high speed permanent magnet motor 30, 32 and 34, 36. In the gas turbine modules C and D, the gas turbines 18, 38 have counter rotating rotors 40, 42 and 44, 46 with each rotor driving a high speed permanent magnet electric generator 48, 50 and 52, 54. The operation of the modules and the power management by integrators 1 and 2 (56, 58) are accomplished in the manner described in the referenced patent with excess electrical power supplied to the energy user 60, as shown in FIG. 1. It is to be understood that the user may be a remote user or a device or system associated with the described system that consumes the generated power.

The remaining components of the closed cycle system 10 remain as described with reference to the system disclosed in U.S. Pat. No. 6,282,897 with a reconfiguration of the circuit lines for the compression and expansion to accommodate the mixed medium operation. In brief, the primary working medium is preferably an inert or neutral gas that will not interact with the secondary phase change medium. The neutral gas, such as Helium, is separated from the phase change medium, such as Freon, after expansion in a condenser/exchanger 62 and returned to the system through lines 63 and 65. The expanded neutral gas is delivered by line 64 to the first internal stage 66 of compressor 20 of compressor module A. Cooled by injected liquid Freon in line 67, which changes to gas, the gas mixture is delivered from the second internal stage 68 to common line 70 for delivery to the first internal stage 72 of high pressure compressor 16 through line 74 as controlled by valve 76 and to heat source E through line 78 as controlled by valve 80.

In line 82, controlled by valve 84, liquid Freon pumped by high pressure pump 85 is injected into the stages 72, 86 of the high pressure compressor 16 through line 88. The gaseous Freon mixes with the primary motive gas in the second internal stage 86 and is delivered to heat source F. Sub-lines 89 and 90 bleed gases into the pressurized chambers 12, 14 and return the gases to the heat source F to minimize condensation of the Freon in the chambers. Liquid return drains can be included in chambers, if necessary, to return liquid Freon to the condenser/exchanger 62.

The thermally charged high pressure gases are delivered to the high pressure internal stage 92 of turbine 18 through line 94 for expansion in the two stages 92, 96 of the high pressure turbine module C. High temperature gases from line 94 can be added to the turbine stages at C1, C2 and C3 for isothermal expansion. Partially expanded gases are delivered to low pressure module D through line 98 controlled by valve 100, where the gases mix with thermally recharged gases from heat source E in line 102 controlled by valve 104. The mixed and thermally recharged gases are delivered through line 106 to the higher pressure stage 108 of gas turbine 38 and expanded in two stages 108, 110 before exhausting through line 112 to the condenser/exchanger 62 for recycling.

The cycling of the working fluid and phase change fluid in the system circuit in FIG. 1 can be explained with reference to the thermodynamic diagram of FIG. 2.

As noted, in the special consideration of a closed system, an inert gas, such as Helium, Argon or Xenon, can be used as the working fluid with a phase changeable Freon used as the heat recovery medium. In the staged compression 1-2, liquid Freon is injected through lines 67, 88 into the compression stages for isothermic compression with the liquid Freon changing to gas and mixing with the primary working fluid. Final adiabatic compression occurs in the final high pressure stage 86 of the compressor module B and is depicted as the path 2-3 on the diagram of FIG. 2.

Figure 2:
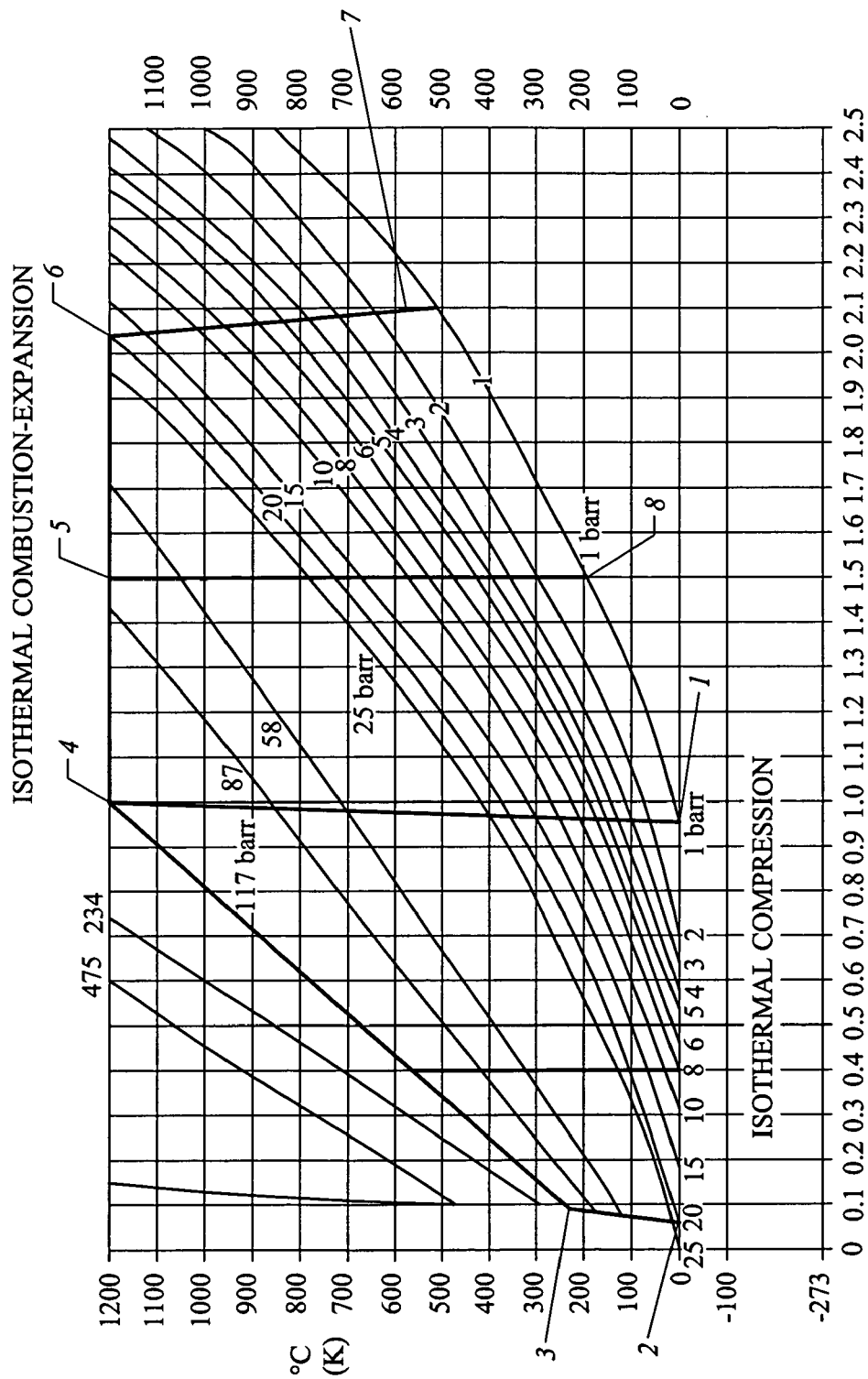
FIG. 2 is a temperature-entropy diagram depicting the evolution of the successive phases of the new universal closed cycle system.

The final result is a multi-phase, isothermal mix of cooled gases which are conducted through the heat sources and are heated in a successive isobaric 3-4 and isothermic 4-5-6 manner as depicted in FIG. 2. The gas mix is expanded successively, first isothermally at 4-5-6 and finally, adiabatically at 6-7 in the two counter rotating gas turbine modules C and D.

Each counter rotating gas turbine module has two internal stages for expansion of gases. In the high pressure gas turbine module C, gases from the thermal source F are initially expanded adiabatically and, as the temperature drops, in a preferred embodiment the gases are supplemented by hot gases injected into the stages C2 and C3 to maintain the maximum operable temperature as the pressure falls. This is represented by path 4-5-6 in FIG. 2. The final adiabatic expansion in the gas turbine module D is represented by the path 6-7 with expanded gases cooling in the bottom cycle path 7-8-1 in FIG. 2. Liquid Freon is recovered in a condenser/exchanger 62 and the expanded inert gases are cycled to the compressor module A.

The complete thermal cycle is developed in two successive thermodynamic zones; first in the negative entropic zone 1-2-3-4-1, and second in the positive entropic zone 1-4-5-6-7-8-1.

If the combined cycle is limited to the negative entropic zone, 1-2-3-4-1, from the starting point of the cycle "temperature 1 and pressure 1," after isothermal compression 1-2, including Freon refrigeration followed by an adiabatic compression 2-3, isobaric combustion 3-4, and adiabatic expansion 4-1, the cycle can finish at the same initial point 1 of temperature and pressure. With reduced heat rejection from the closed cycle, the efficiency is reaching a maximum absolute thermodynamic level.

More power, however, can be generated by isothermically extending the maxim temperature acceptable for the structure of the gas turbine in the positive entropic zone 4-5-6, when the closed cycle rejects the residual heat to a bottom recuperative associated Rankine cycle 7-8-1, cooling the mixed expanded gases and collecting the liquefied Freon at condenser/exchanger 62. The minimum bottom isothermal compression and the maximum top isothermal combustion-expansion raises the efficiency to the level of the Carnot cycle.

While in the foregoing embodiment of the present invention have been set forth in considerable detail for the purposes of making a complete disclosure of the invention, it may be apparent to those of skill in the art that numerous changes may be made in such detail without departing from the spirit and principles of the invention.

The invention claimed is:

1. A closed-cycle gas turbine power generator system comprising:
   a combined cycle system with a neutral gaseous primary motive medium and a secondary phase change medium wherein the combined cycle system has a lower pressure sub-system having a counter-rotating compressor module in combination with a counter-rotating gas turbine module, and a higher pressure sub-system having a counter-rotating compressor module and a counter-rotating gas turbine module wherein the phase change medium in liquid form is injected into the compressor module of the lower pressure sub-system and the compressor module of the higher pressure sub-system during compression of the primary motive medium for substantially isothermal compression with the liquid phase change medium changing to a gas that mixes with the gaseous primary motive medium to form a compressed gaseous mixture;
   a heat source wherein the compressed gaseous mixture is heated by the heat source and supplied to the gas turbine module of the higher pressure sub-system for partial expansion and the partially expanded gases are supplied to the gas turbine module of the lower pressure sub-system for expansion wherein a portion of the compressed gaseous mixture from the compressor module of the lower pressure sub-system is heated by the heat source and combined with the gaseous mixture from the gas turbine module of the higher pressure sub-system and expanded in the gas turbine module of the lower pressure sub-system; and,
   a condenser wherein the expanded gaseous mixture from the gas turbine of the lower pressure sub-system is delivered to the condenser for separation of the phase change medium as a liquid from the gaseous primary motive medium.

2. The closed-cycle, gas turbine power generation system of claim 1 wherein the counter rotating compressor modules each have a compressor with a first rotor and a second rotor wherein the second rotor rotates in a direction opposite that of the first rotor; and, the counter-rotating gas turbine modules each have a gas turbine with a first rotor and a second rotor wherein the second rotor rotates in a direction opposite that of the first rotor.

3. The closed-cycle turbine power generation system of claim 2 wherein the counter-rotating compressor modules each have a first motor connected to the first rotor and a second motor connected to the second rotor for driving the rotors, and the counter rotating gas turbine modules each have a first generator connected to the first rotor and a second generator connected to the second rotor for generating electrical power.

4. The closed-cycle gas turbine power generation system of claim 1 wherein the compressor module and the gas turbine module of the higher pressure sub-system are contained in a pressurizable chamber.

5. The closed-cycle gas turbine power generation system of claim 1 wherein the heat source comprises a first heat source for the gaseous mixture from the compressor module of the higher pressure sub-system and a second heat source for the gaseous mixture from the compressor module of the lower pressure sub-system.

6. The closed-cycle gas turbine power generation system of claim 1, including at least one integrator, wherein operation is controlled by the integrator wherein the compressor modules and gas turbine modules have circuit lines for flow of the gaseous primary flow medium, the secondary phase change medium, and the gaseous mixture wherein the circuit lines have control valves under control of the integrator for efficient generation of power.

* * * * *